United States Patent
Inoue

(10) Patent No.: US 6,748,547 B1
(45) Date of Patent: Jun. 8, 2004

(54) SYSTEM AND METHOD OF CONTROLLING POWER CONSUMPTION BY DYNAMICALLY CONTROLLING BRIGHTNESS OF DISPLAY WITH INVERSELY PROPORTIONAL TO OPERATING FREQUENCY OF CPU

(75) Inventor: Naoyuki Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 575 days.

(21) Appl. No.: 09/653,007

(22) Filed: Aug. 31, 2000

(30) Foreign Application Priority Data

Nov. 9, 1999 (JP) .............................. 11-317990

(51) Int. Cl.$^7$ ................................ G06F 1/32
(52) U.S. Cl. .................. 713/322; 713/300; 713/320
(58) Field of Search ............................. 713/322, 300, 713/320

(56) References Cited

U.S. PATENT DOCUMENTS

| | | | | |
|---|---|---|---|---|
| 4,413,269 A | * | 11/1983 | Pawletko et al. | 347/143 |
| 4,616,356 A | * | 10/1986 | Wilkinson et al. | 369/116 |
| 4,864,478 A | * | 9/1989 | Kanamaru | 386/75 |
| 5,659,843 A | * | 8/1997 | Takano et al. | 399/66 |
| 5,915,120 A | * | 6/1999 | Wada et al. | 713/310 |
| 6,009,056 A | * | 12/1999 | Araki et al. | 369/47.4 |
| 6,076,171 A | * | 6/2000 | Kawata | 713/501 |
| 6,118,743 A | * | 9/2000 | Kumita | 369/47.44 |
| 6,278,421 B1 | * | 8/2001 | Ishida et al. | 345/63 |
| 6,326,938 B1 | * | 12/2001 | Ishida et al. | 345/63 |
| 6,512,652 B1 | * | 1/2003 | Nelson et al. | 360/78.01 |

FOREIGN PATENT DOCUMENTS

| | | | | |
|---|---|---|---|---|
| EP | 0632360 A1 | * | 4/1995 | G06F/1/32 |
| JP | 5-66866 | | 3/1993 | |
| JP | 5-94228 | | 4/1993 | |
| JP | 5-324117 | | 12/1993 | |
| JP | 6-83501 | | 3/1994 | |
| JP | 7-226013 | | 8/1995 | |
| JP | 7-271323 | | 10/1995 | |
| JP | 9-62397 | | 3/1997 | |
| JP | 10-149237 | | 6/1998 | |
| JP | 10-209953 | | 8/1998 | |
| JP | 10-268963 | | 10/1998 | |
| JP | 10 268 986 | | 10/1998 | |
| JP | 10268986 | * | 10/1998 | G06F/1/32 |

* cited by examiner

*Primary Examiner*—Dennis M. Butler
*Assistant Examiner*—Nitin C. Patel
(74) *Attorney, Agent, or Firm*—Westerman, Hattori, Daniels & Adrian, LLP

(57) ABSTRACT

A power control unit for a battery-driven data processing system, in which the power consumption of the whole system is prevented from increasing by controlling the clock frequency of a CPU and the brightness of a display unit, is disclosed. When the clock frequency of the CPU is increased, the brightness of the display unit connected to the data processing system having the CPU built therein is decreased while, when the clock frequency of the CPU is reduced, the brightness of the display unit is increased thereby to maintain a substantially constant power consumption. In the case where the brightness of the display unit connected to the data processing system is increased, on the other hand, the clock frequency of the CPU is reduced, while in the case where the brightness of the display unit is reduced, the clock frequency of the CPU is increased thereby to maintain a substantially constant power consumption. Further, the clock frequency of the CPU is reduced at the time of spinup of the drive motor for a disk-shaped recording medium, and at the end of the spinup operation, the clock frequency of the CPU can be restored to the original state.

16 Claims, 8 Drawing Sheets

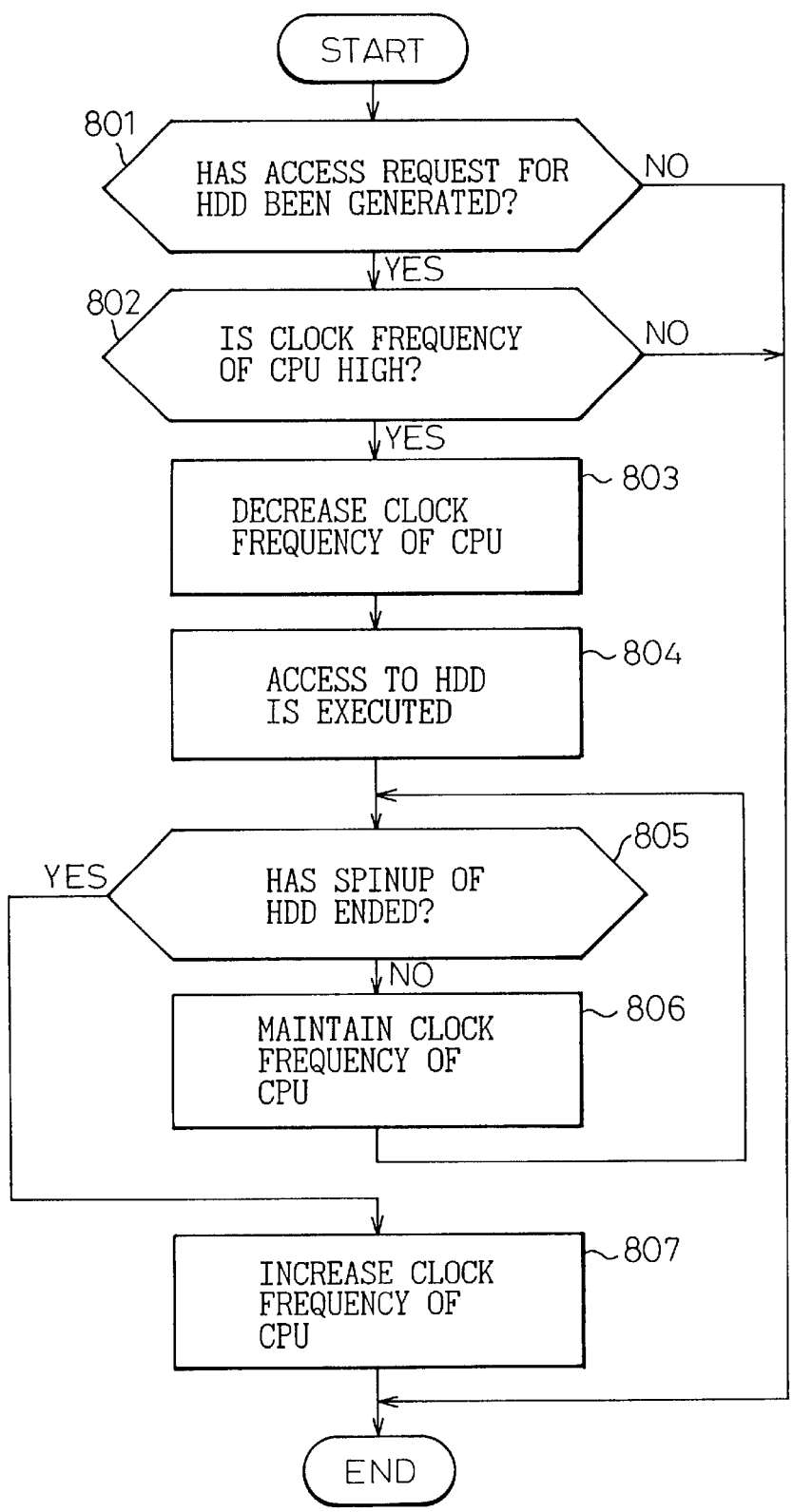

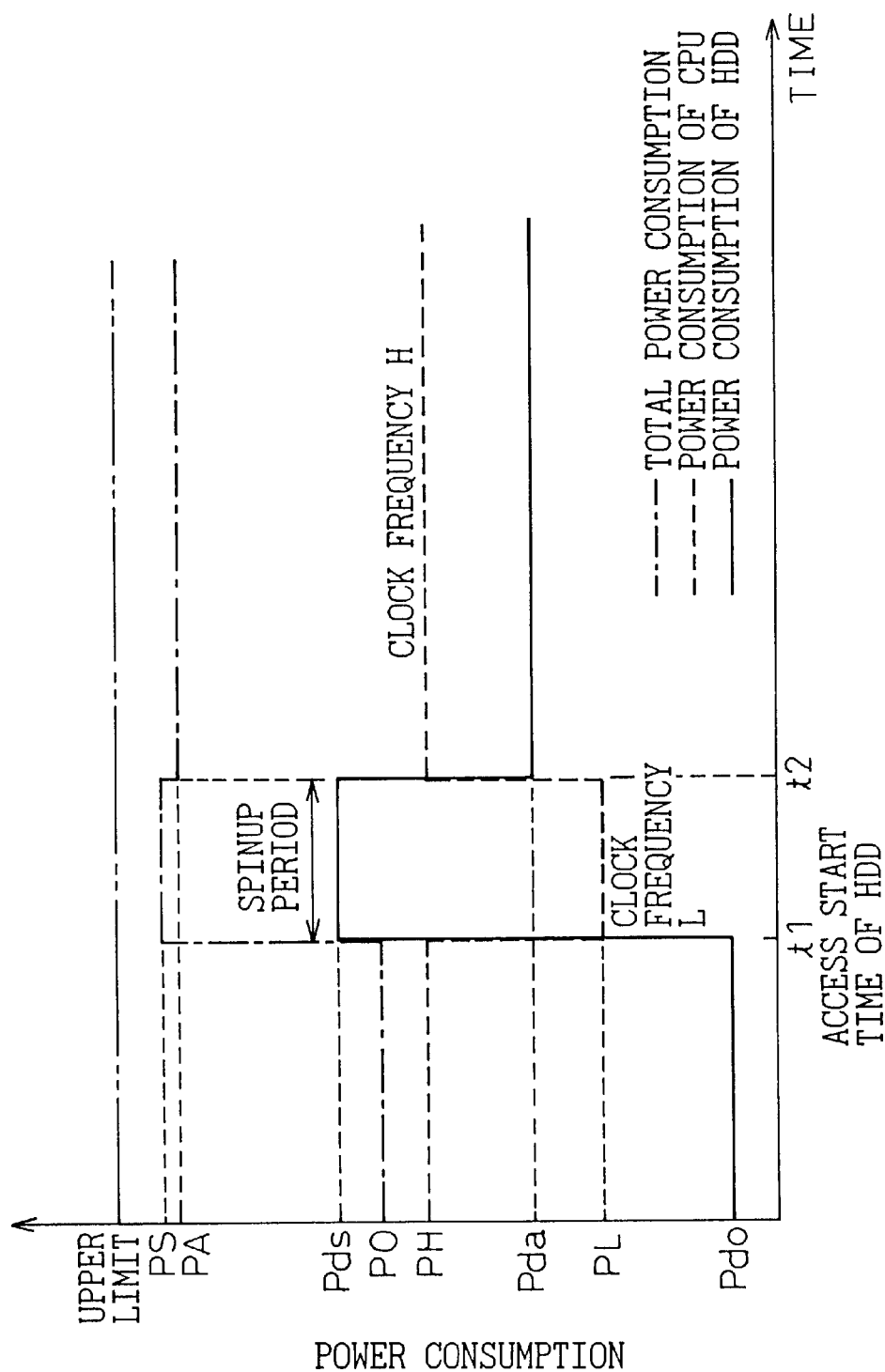

SYSTEM AND METHOD OF CONTROLLING POWER CONSUMPTION BY DYNAMICALLY CONTROLLING BRIGHTNESS OF DISPLAY WITH INVERSELY PROPORTIONAL TO OPERATING FREQUENCY OF CPU

BACKGROUND OF THE INVENTION

1. Field of the Invention

The present invention relates to a power control unit, or in particular to a power control unit for a data processing system capable of switching the system performance by changing the operating frequency (hereinafter referred to as the clock frequency) of a processing circuit.

2. Description of the Related Art

In recent years, an extension of the use of a high-performance CPU (central processing unit) has remarkably improved the processing capability of data processing systems such as computers which, in turn, has increased the power consumption. On the other hand, a portable terminal making up a data processing system has been reduced in size and weight while the liquid crystal display panel making up a display unit has increased in size, which is another cause of increased power consumption in the data processing system.

Due to the decreased size and weight of the portable terminal, the capacity of the battery incorporated in the portable terminal and hence the electric energy capable of being supplied are limited. In the case where it is desired to increase the clock frequency of the processing circuit or the brightness of the display unit, the power consumption may exceed the battery capacity. Some means to cope with this problem is desired.

In a conventional data processing system in which the clock frequency of a processing circuit such as a CPU or a processor can be changed, the system performance of the data processing system is changed in response to a user instruction or some change of the system status such as the insertion or removal of an AC adaptor. The system performance can be changed by changing the clock frequency of the processing circuit built into the data processing system.

Specifically, as disclosed in Unexamined Japanese Patent Publication (Kokai) No. 10-26896 and the like, one well-known methods of reducing the power consumption of the computer system consists of reducing the clock frequency of the processing circuit. According to this method, the user is permitted to select the clock frequency of the processing circuit, so that the user sets the clock frequency of the processing circuit to a low level by key entry or the like operation thereby to reduce the capacity of the computer system as a whole, resulting in a reduced power consumption.

A data processing system operating on a battery, however, generally has the problem that the operable range of the system is limited by the total or residual capacity of the battery. In the case where the clock frequency of the processing circuit is changed or, especially, the clock frequency is changed to a large value, the power consumption of the system increases sometimes to such an extent that operation on the battery is difficult. A power consumption exceeding the output capacity of the battery is a case in point.

The power consumption of the data processing system may be limited also by the thermal design. The thermal capacity tolerable for the data processing system may be exceeded, for example, in the case where the status is changed to increase the clock frequency of the processing circuit while the subsystems other than the processing circuit are operating in the data processing system.

In order to avoid this problem, the system is designed with a sufficient thermal capacity or with a battery of a sufficient capacity at the sacrifice of an increased size, weight and cost of the data processing system.

SUMMARY OF THE INVENTION

Accordingly, a first object of the invention is to provide a power control unit for a data processing system or, in particular, a power control unit for a data processing system driven by a battery, in which an increased power consumption of the whole data processing system is suppressed by reducing the power consumption in a display unit with the increase in the clock frequency of the processing circuit.

A second object of the invention is to provide a power control unit for a data processing system or, in particular, a power control unit for a data processing system driven by a battery, in which the increase in power consumption of the data-processing system as a whole is suppressed by reducing the clock frequency of the processing circuit in the case where the brightness of the display unit is increased.

A third object of the invention is to provide a power control unit for a data processing system or, in particular, a power control unit for a data processing system driven by a battery, in which the increase in power consumption of the data processing system as a whole is suppressed by reducing the clock frequency of the processing circuit temporarily at the time of spinup of the drive motor for a disk-shaped recording medium.

The features of the invention for achieving the aforementioned objects of the invention are described as first to third aspects thereof below.

According to the first aspect of the invention, there is provided a power control unit for a data processing system having a system performance capable of being switched by changing the clock frequency of a processing circuit, comprising a circuit for reducing the power consumption by reducing the brightness of a display unit connected to the data processing system in the case where the clock frequency of the processing circuit is increased, and a circuit for increasing the power consumption by increasing the brightness of a display unit connected to the data processing system in the case where the clock frequency of the processing circuit is decreased.

According to the second aspect of the invention, there is provided a power control unit for a data processing system having a system performance capable of being switched by changing the clock frequency of a processing circuit, comprising a circuit for reducing the clock frequency of the processing circuit in the case where the brightness of the display unit connected to the data processing system is increased and a circuit for increasing the clock frequency of the processing circuit in the case where the brightness of the display unit connected to the data processing system is decreased.

According to the third aspect of the invention, there is provided a power control unit for a data processing system having a system performance capable of being switched by changing the clock frequency of a processing circuit, comprising a circuit for reducing the clock frequency of the processing circuit at the time of spinup of the drive motor for a disk-shaped recording medium built in the data processing system and a circuit for restoring the clock frequency of the processing circuit to the original state at the end of the spinup operation of the drive motor.

In the first to third aspects described above, the data processing system can be a notebook-sized personal computer, and the display unit can be a liquid crystal display panel.

In the first aspect, the power consumption of the display unit is reduced by the decrease in the brightness thereof in the case where the clock frequency of the processing circuit of the data processing system is increased, while the power consumption of the display unit is increased by increasing the brightness thereof in the case where the clock frequency of the processing circuit is decreased, and therefore the power consumption of the data processing system as a whole is not increased beyond a specified value.

In the second aspect, the clock frequency of the processing circuit is decreased in the case where the brightness of the display unit of the data processing system is increased, while the clock frequency of the processing circuit is increased with the decrease in the brightness of the display unit, and therefore the power consumption of the data processing system as a whole is not increased beyond a specified value.

In the third aspect, the clock frequency of the processing circuit is decreased at the time of spinup of the drive motor for the disk-shaped recording medium while the clock frequency of the processing circuit is restored to the original state at the end of the spinup operation, and therefore the power consumption of the data processing system as a whole is not increased beyond a specified value.

The present invention according to the first to third aspects thereof can be realized with a notebook-sized personal computer having a liquid crystal panel as a display unit.

BRIEF DESCRIPTION OF THE DRAWINGS

The present invention will be more clearly understood from the description as set forth below with reference to the accompanying drawings, wherein:

FIG. 8 is a flowchart showing the process for the control operation of the power control unit according to a third embodiment of the invention; and FIG. 9 is a waveform diagram showing the transition of the power consumption for the control operation of the power control unit according to the third embodiment.

DESCRIPTION OF THE PREFERRED EMBODIMENTS

Embodiments of the present invention will be described in detail below with reference to specific examples shown in the accompanying drawings.

Figure 1:
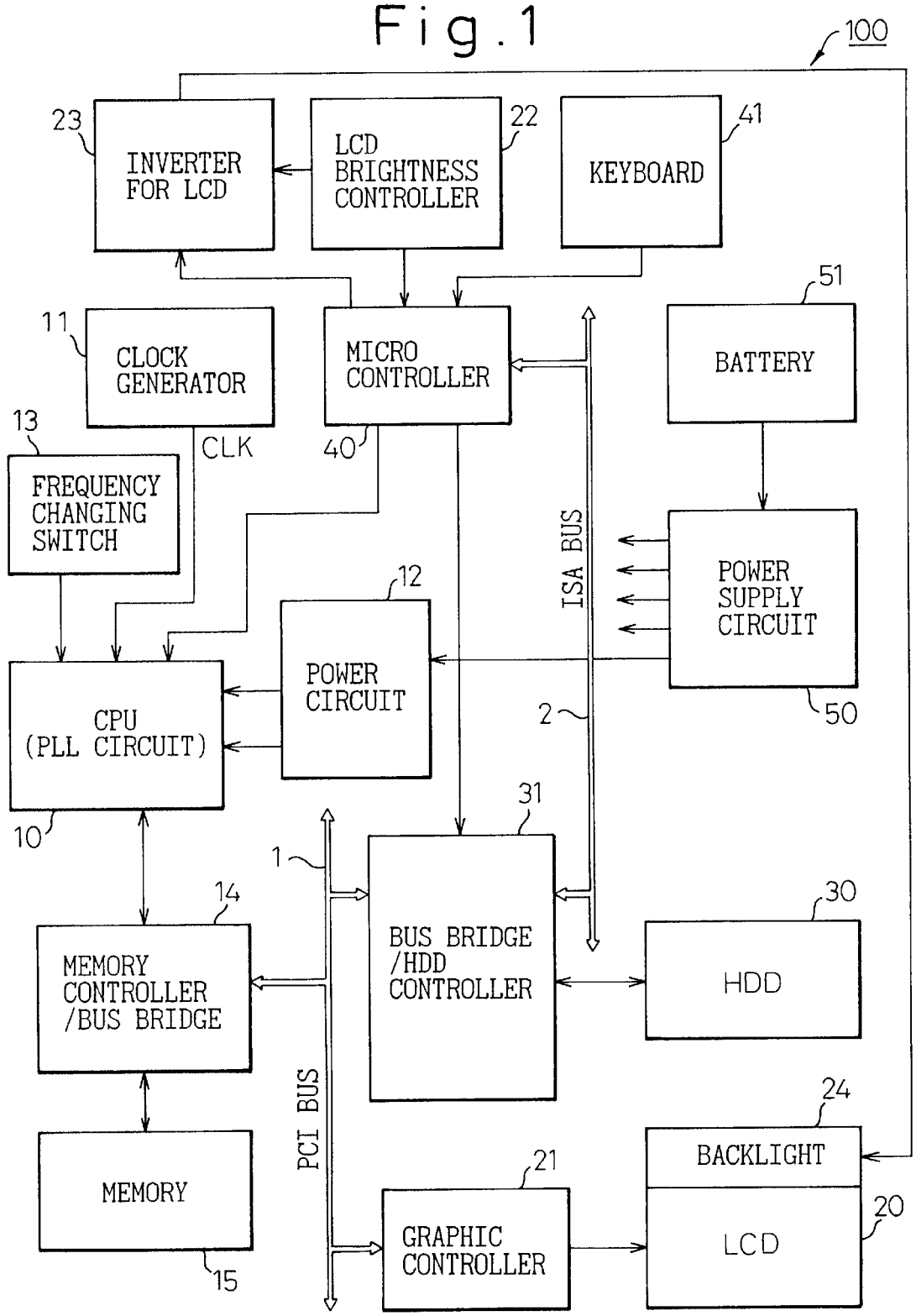
FIG. 1 is a circuit block diagram showing a general configuration of a data processing system comprising a power control unit according to an embodiment of the invention.

FIG. 1 is a circuit block diagram showing a general configuration of a data processing system 100 having a power control unit according to an embodiment of the invention. The data processing system 100 according to this embodiment is a notebook-sized personal computer, for example.

The main component members of the data processing system 100 include a CPU 10 constituting a data processing circuit, a memory 15 for storing data such as a program, a liquid crystal display unit 20 for displaying data, a hard disk device 30 for storing a large amount of data, a microcontroller 40 and a power supply circuit 50.

The CPU 10 is connected to a PCI bus 1 and a memory 15 through a memory controller/bus bridge 14. The memory controller/bus bridge 14 is for controlling the access to the memory from the CPU 10, and the program,is processed in the CPU 10 by being supplied from the memory 15 through the controller/bus bridge 14.

Also, the CPU 10 is supplied with the power from the power supply circuit 50 through a power circuit 12 on the one hand and supplied with a reference clock signal CLK from a clock generator 11 on the other hand. The clock signal CLK is boosted to a size equal to a given number of multiples in the CPU 10 thereby to generate a clock frequency for the CPU 10. The clock frequency of the CPU 10 can be switched by a frequency changing switch 13 connected to the CPU 10. Further, the CPU 10 is supplied with commands from the keyboard 41 through a microcontroller 40 and performs various operations in response to the commands.

The liquid crystal display unit 20 has built therein a liquid crystal display panel and a drive circuit thereof. The display data input from the PCI bus 1 through a graphic controller 21 is displayed by the drive circuit on a liquid crystal panel. The liquid crystal display unit 20 has also built therein a backlight 24 for improving the visibility of the data displayed on the liquid crystal display panel. The power for the backlight 24 is supplied from an inverter 23 for the liquid crystal display unit (LCD). The inverter 23 for the liquid crystal display unit is connected to a LCD brightness controller 22. As the user adjusts the LCD brightness controller 22, the electric energy supplied from the liquid crystal display inverter 23 to the backlight 24 is changed thereby to change the brightness of the backlight 24.

According to this embodiment, the value of the brightness setting input by the user through the liquid crystal display brightness controller 22 is also input to the microcontroller 40 connected to the liquid crystal display inverter 23. As a result, the microcontroller 40 can detect the current brightness of the backlight 24, and, in the case where the brightness of the backlight 24 is required to be changed, the user need not perform the controlling operation but the electric energy supplied from the liquid crystal display inverter 23 to the backlight 24 is changed by the microcontroller 40 thereby to change the brightness of the backlight 24.

The hard disk device 30 is connected to the PCI bus 1 and the ISA bus 2 through a bus bridge/hard disk controller 31.

The ISA bus 2 is connected also to the microcontroller 40. The bus bridge/hard disk controller 31 is also connected to the microcontroller 40. The bus bridge/hard disk controller 31 has the function of trapping the instruction from the CPU 10 to access the hard disk device 30. The operation of the hard disk device 30 is started by writing a read/write instruction into the storage medium in the hard disk device 30. As a result, the CPU 10 and the microcontroller 40 can determine the status of the hard disk 30 and can control the data in the hard disk 30 at the same time.

The power supply circuit 50 is connected to a battery 51 which supplies power to the various parts of the data processing system 100 including the power circuit 12. The power circuit 12 supplies power to the system while at the same time monitoring the condition of the battery 51. The residual capacity of the battery 51 is checked by the power circuit 12.

The CPU 10 according to this embodiment is so configured that the processing performance of the data processing system 100 can be switched by changing the clock frequency (actually, switching it in two stages) as described above. The CPU 10 that can switch the clock frequency is realized by a CPU capable of switching the parallelism of an internal pipeline circuit or by a CPU having the function of multiplying the frequency of the clock supplied from an external source and capable of switching the multiplyer of the external clock frequency.

According to this embodiment, the clock CLK constituting the base of the clock frequency of the CPU 10 is generated in the clock generator 11 and supplied to the CPU 10 thereby to produce the internal clock frequency through a PLL circuit described later. The clock frequency of the CPU 10, which can be changed by the switching signal from the frequency changing switch 14 operated by the user, can also be changed by a switching signal corresponding to the change of the brightness of the backlight 24 input through the microcontroller 40 or by a switching signal corresponding to the change of the power consumption in the hard disk device 30.

The factors for changing the clock frequency of the CPU 10 probably generally include the following:

(1) The insertion and removal of the AC adaptor (when the AC adaptor is inserted, the clock frequency of the CPU is increased, while when the AC adaptor is removed, the clock frequency of the CPU is reduced).

(2) The user elects to change the clock frequency according to the utilities involved.

(3) When other events occur.

Figure 2:
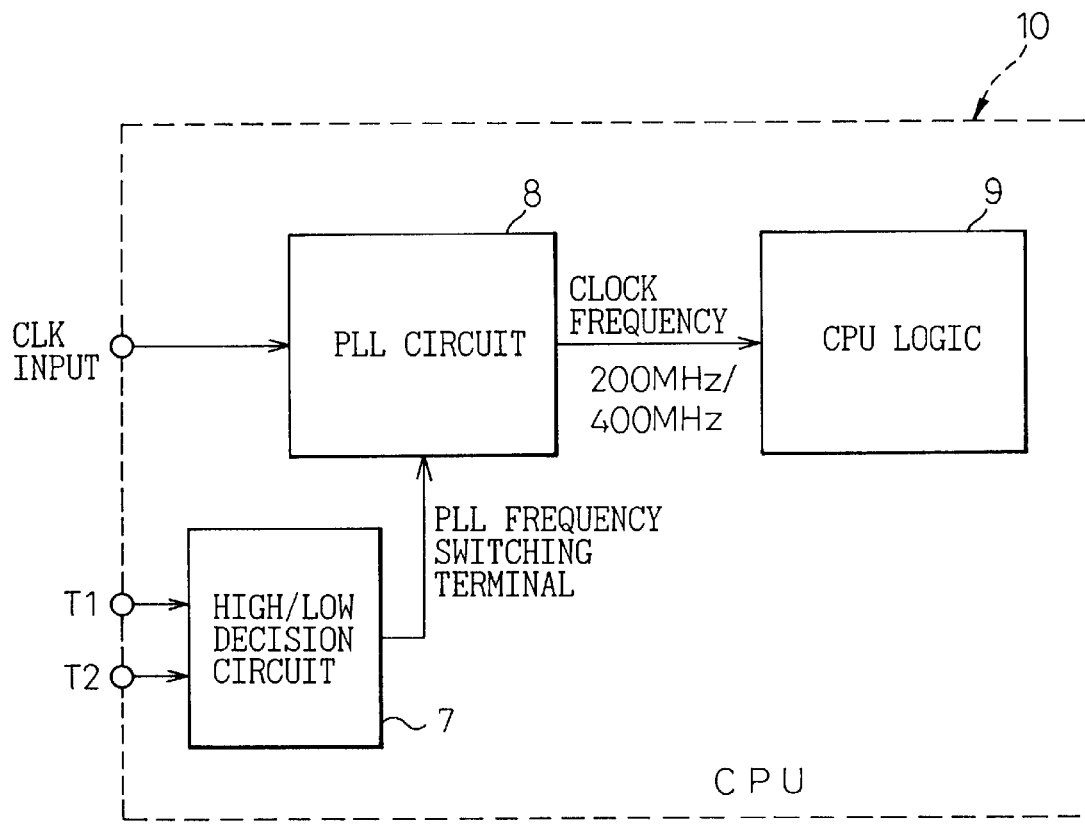
FIG. 2 is a circuit block diagram showing an internal configuration of a CPU shown in FIG. 1 according to a first embodiment.

FIG. 2 is a circuit block diagram showing the internal configuration of the CPU 10 of FIG. 1 according to a first embodiment. A PLL circuit 8 for outputting the clock frequency of a CPU logic 9 is included in the CPU 10. The clock frequency output from the PLL circuit 8 is switchable in two stages of, say, 200 MHz and 400 MHz by the signal input to the PLL frequency changing terminal from a high/low decision circuit 7. The high/low decision circuit 7 has two input terminals T1 and T2. The input terminal T1 is supplied with the frequency changing signal from the microcontroller 40 of FIG. 1, and the input terminal T2 is supplied with the frequency changing signal from the frequency changing switch 13 of FIG. 1. The high/low decision circuit 7 preferentially supplies the PLL circuit 8 with the frequency changing signal input to the input terminal T1. In the case where the frequency changing signal for reducing the clock frequency is input to the input terminal T1 while the clock frequency input to the CPU. logic 9 from the PLL circuit is maintained at 400 MHz by the frequency switching signal from the frequency changing switch 13, therefore, the clock frequency input to the CPU logic 9 from the PLL circuit 8 is changed to 200 MHz.

Figure 3:
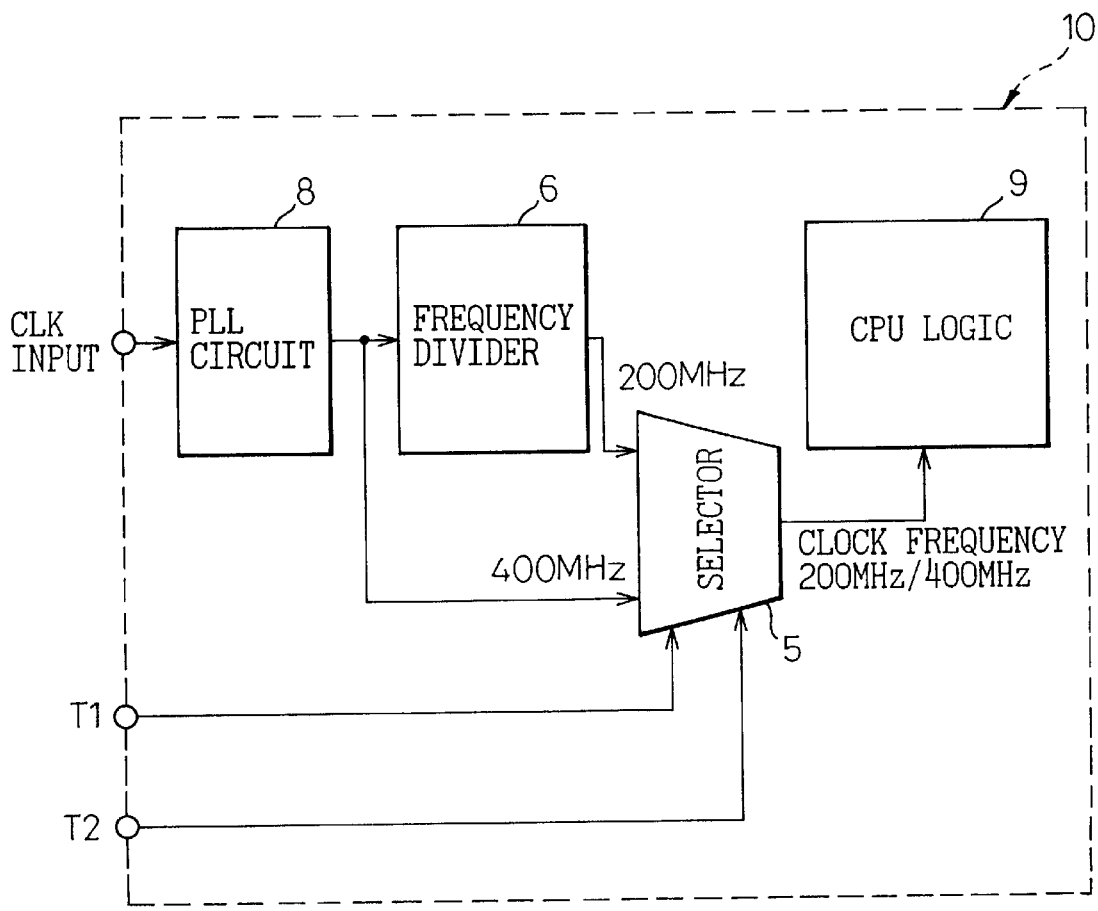
FIG. 3 is a circuit block diagram showing an internal configuration of a CPU shown in FIG. 1 according to a second embodiment.

FIG. 3 is a circuit block diagram showing an internal configuration of the CPU 10 of FIG. 1 according to a second embodiment. In this embodiment, a frequency divider 6 and a selector 5 are arranged in the CPU 10 in addition to the PLL circuit 8 and the CPU logic 9. The frequency divider 6 is for reducing the output frequency of the PLL circuit 8, and when the output frequency of the PLL circuit 8 is 400 MHz, the output frequency of the frequency divider 6 according to this embodiment is 200 MHz. The output frequency of the PLL circuit 8 and the output frequency of the frequency divider 6 are both input to the selector 5. The selector 5 selects one of the two frequencies input thereto and outputs the selected frequency to the CPU logic 9. The selector 5 has two input terminals T1 and T2. The input terminal T1 is supplied with the frequency changing signal from the microcontroller 40 of FIG. 1, and the input terminal T2 is supplied with the frequency changing signal from the frequency changing switch 13 of FIG. 1. The frequency changing signal input to the input terminal T1 is output preferentially to the PLL circuit 8 by the selector 5.

In the case where the frequency changing signal is input to the input terminal T1 while the clock frequency input to the CPU logic 9 from the selector 5 is maintained at 400 MHz by the frequency changing signal from the frequency changing switch 13, for example, the clock frequency input to the CPU logic 9 from the PLL circuit 8 is changed to 200 MHz.

Figure 4:
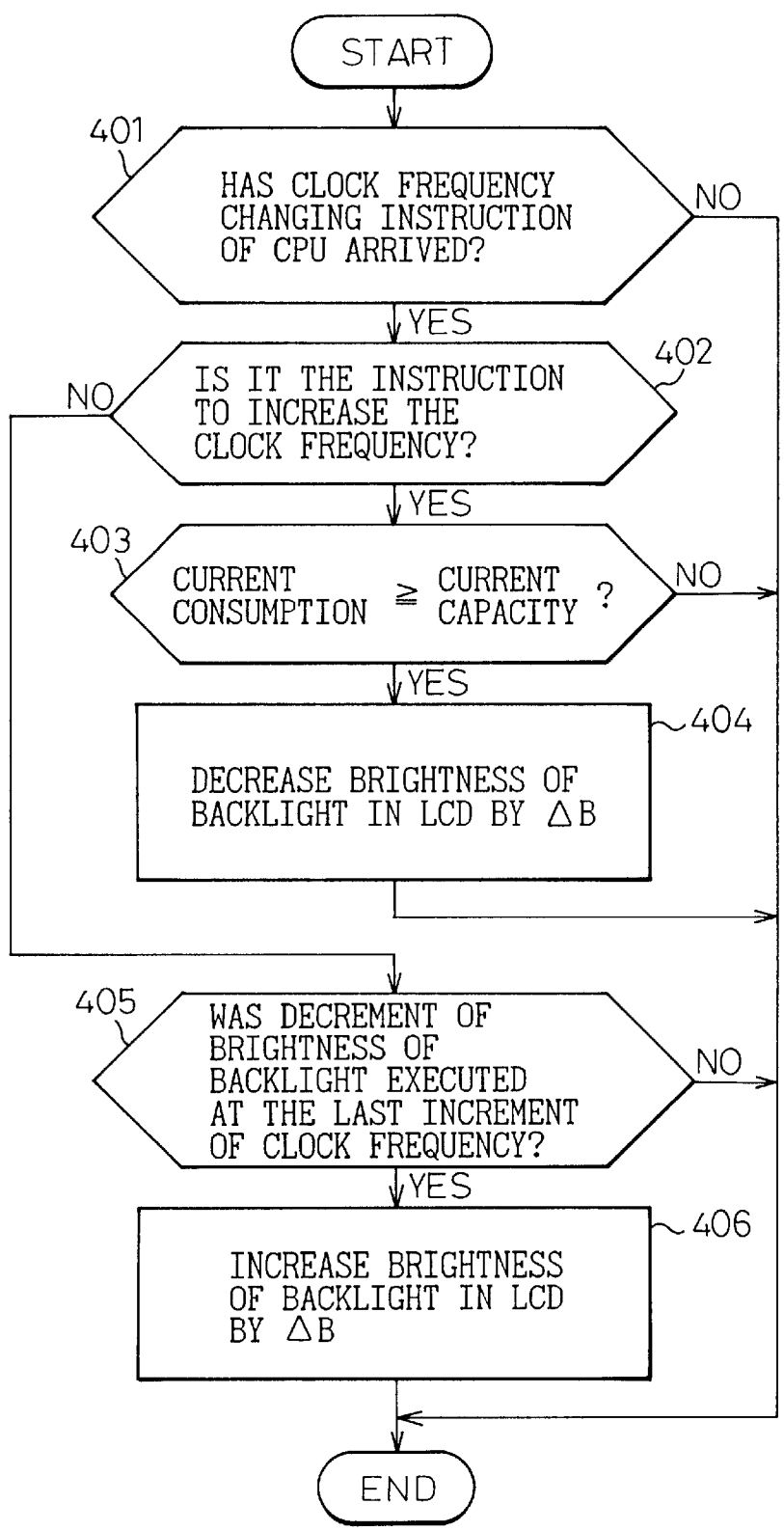
FIG. 4 is a flowchart showing the process for the control operation of the power control unit according to the first embodiment of the invention.

FIG. 4 is a flowchart showing the process for the control operation of the power control unit according to the first embodiment of the invention configured as described above. In the first embodiment, the processing is executed at predetermined time intervals for maintaining the power consumption in the data processing system 10 at not more than the current capacity of the battery 51 in the case where the CPU 10 is switched to a higher clock frequency while the brightness of the backlight 24 of the liquid crystal display unit 20 is high.

In step 401, it is determined whether an instruction to change the clock frequency of the CPU 10 has been received through the frequency changing switch 13. In the absence of an instruction from the CPU 10 to change the clock frequency through the frequency changing switch 13, the routine is terminated as it is, while in the presence of an instruction to change the clock frequency, the process proceeds to step 402.

In step 402, it is determined whether the instruction to change the clock frequency of the CPU 10 through the frequency changing switch 13 is the instruction to increase the clock frequency or not, and in the case where the instruction is to increase the clock frequency, the process proceeds to step 403. Otherwise, i.e. in the case where the instruction is to decrease the clock frequency, the process proceeds to step 405. In step 403, it is determined whether the current consumed for increasing the clock frequency of the CPU 10 is not less than the current capacity of the battery 51 of the data processing system 100. In the case where it is determined in step 403 that the current consumption is smaller than the current capacity, the routine is terminated as it is. In the case where the determination is that the current consumption is not smaller than the current capacity, on the other hand, the process proceeds to step 404. In step 404, the brightness of the backlight 24 of the liquid crystal display unit 20 is reduced by ΔB and the routine is terminated. As long as the brightness is reduced by ΔB, the current consumption is prevented from increasing beyond the current capacity of the battery 51 even when the clock frequency of the CPU 10 is increased.

In step 405, to which the process proceeds upon determination, in step 402, that the instruction to change the clock frequency is to reduce the clock frequency, it is determined whether the brightness of the backlight 24 of the liquid crystal display unit 20 has been decreased at the preceding time of increasing the clock frequency of the CPU 10. In the case where the brightness of the backlight 24 has not been so decreased, the routine is terminated as it is. In the case where the brightness of the backlight 24 has been so decreased, on the other hand, the brightness of the backlight 24 of the liquid crystal display unit 20 is increased by ΔB and the routine is terminated.

As a result of this process, in the case where the clock frequency of the CPU 10 is changed upward when the brightness of the backlight 24 of the liquid crystal display unit 20 is high, the current consumption of the data processing system 100 as a whole can be prevented from exceeding the current capacity of the battery 51 by decreasing the brightness of the backlight 24.

The whole current consumption of the data processing system 100 can be always maintained at a constant value by making sure that the brightness of the backlight 24 of the liquid crystal display unit 20 is reduced by ΔB in the case where the clock frequency of the CPU 10 is increased and that the brightness of the backlight 24 of the liquid crystal display unit 20 is increased by ΔB in the case where the clock frequency of the CPU 10 is decreased. In such a case, steps 403 and 405 of the control process of FIG. 4 are not needed.

Figure 5:
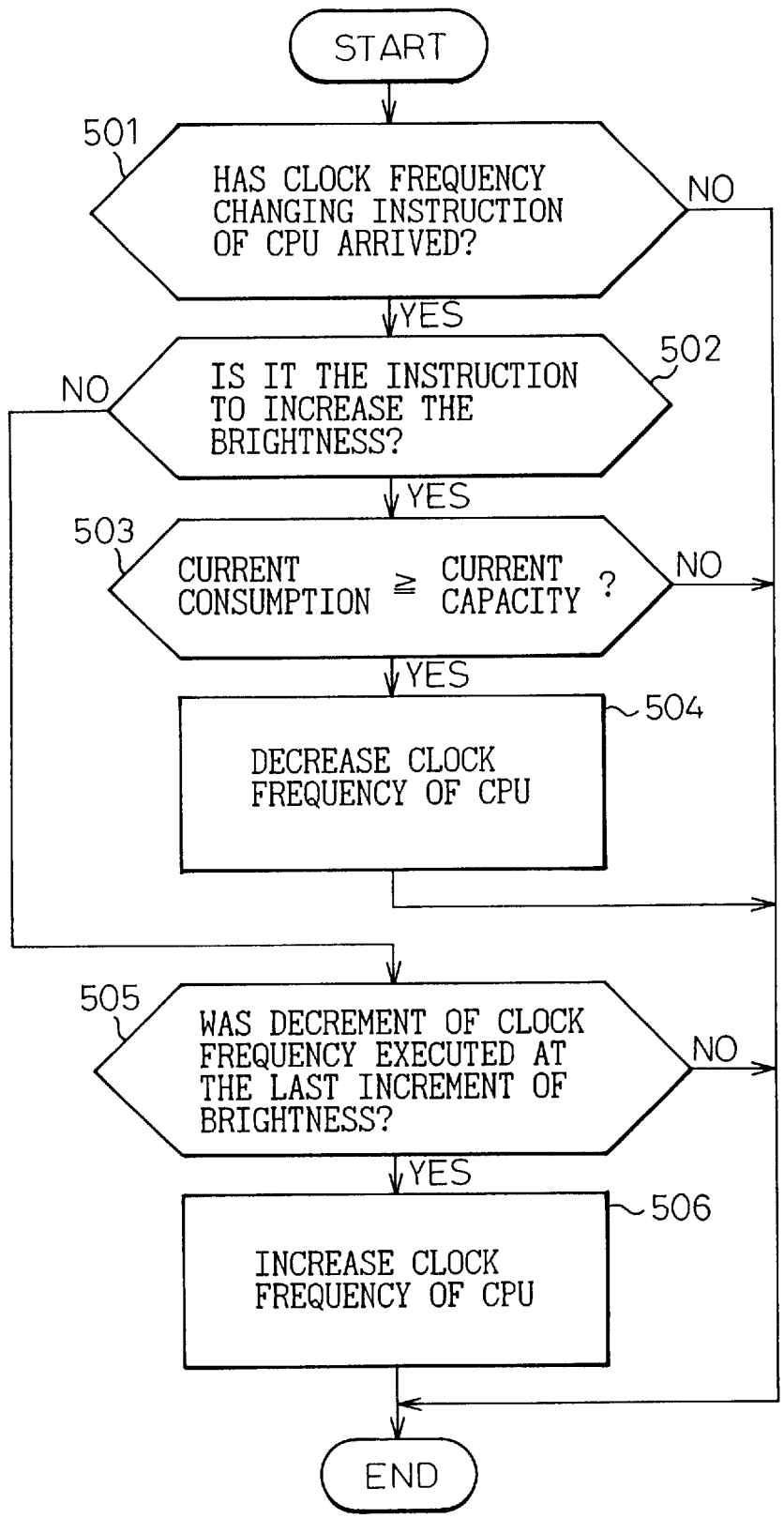
FIG. 5 is a flowchart showing the process for the control operation of the power control unit according to the second embodiment of the invention.

FIG. 5 is a flowchart showing the process for the control operation of the power control unit according to a second embodiment of the invention. The process of the second embodiment is executed at predetermined time intervals for preventing the power consumption of the data processing system 100 from exceeding the current capacity of the battery 51 when the brightness of the backlight 24 of the liquid crystal display unit 20 is changed upward.

In step 501, it is determined whether or not an instruction has been issued to change the brightness of the backlight 24 of the liquid crystal display unit 20. The instruction to change the brightness of the backlight 24 of the liquid crystal display unit 20 is input from the keyboard 41 or the like shown in FIG. 1. In the absence of any instruction to change the brightness of the backlight 24, the routine is terminated as it is, while in the presence of such an instruction, the process proceeds to step 502.

In step 502, it is determined whether the instruction to change the brightness of the backlight 24 is the one for increasing the brightness or not. In the case where the instruction is for increasing the brightness, the process proceeds to step 503, whereas in the case where the instruction is not to increase the brightness, i.e. to decrease the brightness, the process proceeds to step 505. In step 503, it is determined whether the current consumed when the brightness of the backlight is increased is not less than the current capacity of the battery 51 of the data processing system 100. In the case where it is determined in step 503 that the current consumption is smaller than the current capacity, the routine is terminated as it is, while in the case where the determination is that the current consumption is not smaller than the current capacity, on the other hand, the process proceeds to step 504. In step 504, the clock frequency of the CPU 10 is changed from the high value FH to the low value FL and the routine is terminated. Once the clock frequency of the CPU 10 is decreased from the high level FH to the low level FL, the current consumption can be prevented from exceeding the current capacity of the battery 51 even when the brightness of the backlight 24 is increased.

In step 505, to which the process proceeds in the case where it is determined in step 502 that the brightness of the backlight 24 is changed downward, it is determined whether the clock frequency of the CPU 10 is decreased with the preceding increase in the brightness of the backlight 24. In the case where the clock frequency of the CPU 10 is not so decreased, the routine is terminated as it is, while in the case where the clock frequency of the CPU 10 is decreased, the routine is terminated after increasing the clock frequency of the CPU 10.

As a result of this process, in the case where the brightness of the backlight 24 of the liquid crystal display unit 20 is changed upward when the clock frequency of the CPU 10 is high, the current consumption of the data processing system 100 as a whole can be prevented from exceeding the current capacity of the battery 51 by decreasing the clock frequency of the CPU 10.

By the way, the current consumption of the data processing system 100 as a whole can also be maintained always at a constant level by reducing the clock frequency of the CPU 10 whenever the brightness of the backlight 24 of the liquid crystal display unit 20 is changed upward and by increasing the clock frequency of the CPU 10 whenever the brightness of the backlight 24 of the liquid crystal display unit 20 is reduced. In such a case, steps 503 and 505 of the control process shown in FIG. 5 are not needed.

Figure 6:
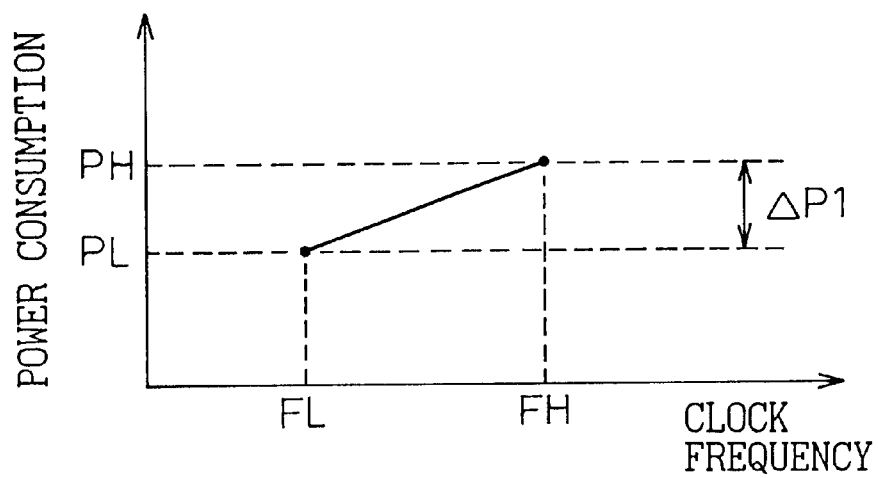
FIG. 6 is a characteristic diagram showing the relation between the clock frequency of the CPU and the power consumption.
Figure 7:
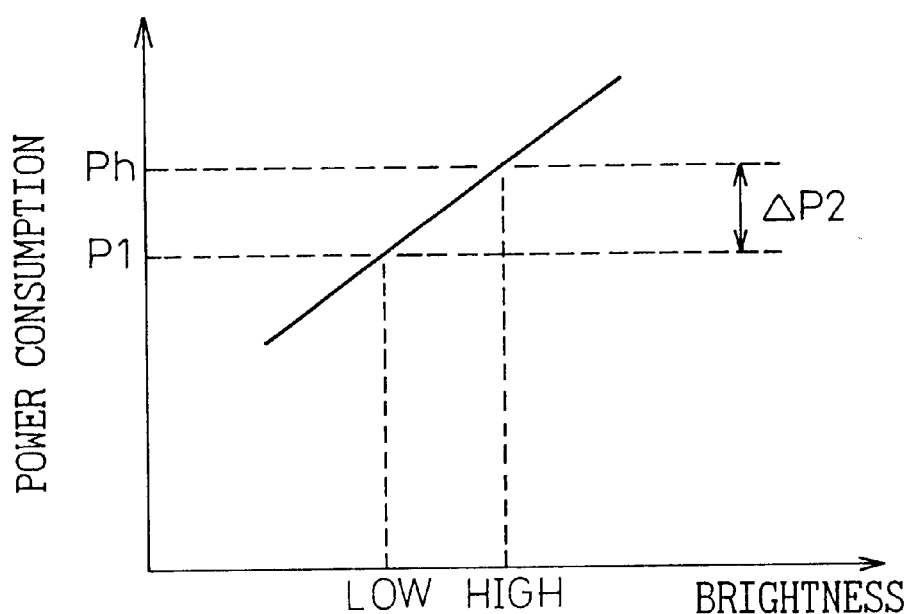
FIG. 7 is a characteristic diagram showing the relation between the brightness of the liquid crystal display unit and the power consumption.

FIG. 6 is a diagram showing the relation between the power consumption and two clock frequencies FL (lower frequency) and FH (higher frequency) of the CPU 10 shown in FIG. 6. From this diagram, it is seen that the power consumption is PL when the clock frequency of the CPU 10 is FL, the power consumption is PH larger than PL when the clock frequency of the CPU 10 is FH, and the power consumption of the data processing system is increased by ΔP1 when the clock frequency of the CPU 10 is changed from FL to FH. On the other hand, FIG. 7 is a diagram showing the relation between the power consumption and the brightness of the backlight 24 of the liquid crystal display unit 20. The brightness of the backlight 24 can be continuously changed. Assuming that the power consumption of the backlight 24 is P1 for a predetermined low brightness, and Ph larger than P1 for a predetermined high brightness, it is seen that the power consumption of the data processing system increases by ΔP2 when the brightness of the backlight 24 is changed from low to high level.

Thus, according to the first embodiment, the brightness of the backlight 24 is changed from a high to a low level in such a manner that when the clock frequency of the CPU 10 is changed from FL to FH and the power consumption is increased by ΔP1, the reduction amount ΔP2 of the power consumption due to the reduced brightness of the backlight 24 changes to ΔP1. This brightness difference is set to ΔB as described with reference to FIG. 4. In the second embodiment, on the other hand, the sum of the power consumption associated with the highest brightness of the backlight 24 and the power consumption FL at the lower clock frequency FL of the CPU 10 is maintained at a value not exceeding the maximum current capacity that can be supplied by the battery 51.

FIG. 8 is a flowchart showing the process for the control operation of the power control unit according to a third embodiment of the invention. The process of the third embodiment is executed at predetermined time intervals for preventing the current capacity of the battery 51 from being exceeded by the power consumption of the data processing system 100 with the increase in the current consumption due to the spinup at the start of access to the hard disk device 30. Normally when not accessed, the hard disk device 30 is in the power consumption reduction mode so that the disk is rotating at low speed or remains stationary. Upon generation of an request for access to the hard disk device 30, the disk begins to rotate at high speed. The most power is consumed at the start of rotation of the disk 30, which is called the spinup.

In step 801, it is determined whether a request for access to the hard disk device (HDD) 30 has occurred or not. In the absence of a request for access to the hard disk device 30, the routine is terminated as it is, while in the presence of a request for access to the hard disk device 30, the process proceeds to step 802.

In step 802, it is determined whether the current clock frequency of the CPU 10 is high or low, and in the case where the clock frequency is high, the process proceeds to step 803, while in the case where the clock frequency is not high, the routine is terminated as it.

In step 803, to which the process proceeds when the current clock frequency of the CPU 10 is high, the clock frequency of the CPU 10 is decreased to low level. In the following step 804, the access to the hard disk device 30 is executed.

Step 805 is to determine whether the spinup has ended or not in the hard disk device 30. In the case where the spinup has yet to be ended, the process proceeds to step 806, otherwise the process proceeds to step 807. In step 806, the clock frequency of the CPU 10 is maintained at the current low level, and the process returns to step 805. In the case where the spinup of the hard disk device 30 has not ended, on the other hand, the operation of steps 805 and 806 is repeated.

In the case where it is determined in step 806 that the spinup of the hard disk device 30 is complete, on the other hand, the power consumption of the hard disk device 30 decreases, and therefore the clock frequency of the CPU 10 is increased and restored to high level in step 807.

FIG. 9 is a waveform diagram showing the transition of the power consumption for the control operation of the power control unit according to the third embodiment. The mode of hard disk device 30 changes to the low power consumption mode if it is not accessed for a long time and the power consumption thereof becomes Pdo. Once the access to the hard disk device 30 is started at time point t1, the hard disk device 30 enters the spinup mode so that the power consumption of the hard disk device 30 increases to Pds. At time point t2 when the access mode begins upon expiry of the spinup period, the power consumption of the hard disk device 30 decreases to Pda. On the other hand, if the hard disk device 30 is not accessed for a long time, and if the clock frequency of the CPU 10 is set to high level H, the power consumption thereof becomes PH. Thus, the total power consumption of the hard disk device 30 under this condition is PO which is the sum of Pdo and the power consumption PH of the CPU 10.

Once the hard disk device 30 enters the spinup mode at time point t1 and the power consumption thereof increases to Pds, however, the total power consumption constituting the sum of the power consumption Pds of the hard disk device 30 and the power consumption PH of the CPU 10 exceeds the upper limit of the power consumption of the data processing system. In the case where the hard disk device 30 enters the spinup mode, therefore, the clock frequency of the CPU 10 is forcibly changed to the low side L and the power consumption becomes PL. Under this condition, the total power consumption constituting the sum of the power consumption Pds of the hard disk device 30 and the power consumption PL of the CPU 10 becomes PS which is lower than the upper limit of the power consumption of the data processing system.

At time point t2 when the spinup period of the hard disk device 30 ends, the power consumption becomes Pda. Then, the total power consumption constituting the sum of the power consumption Pda of the hard disk device 30 and the power consumption PH for the high clock frequency H of the CPU 10 is lower than the upper limit of the power consumption of the data processing system. At the end of the spinup of the hard disk device 30, therefore, the clock frequency of the CPU 10 is forcibly changed to a high level H so that the power consumption is returned to PH.

As described above, in the spinup mode of the hard disk device 30, the clock frequency of the CPU 10 is reduced so that the power consumption of the data processing system 100 can be controlled not to exceed the upper limit thereof, i.e. the power supply capacity of the battery 51.

At the time of spinup of the hard disk device 30, the power consumption of the data processing system 100 can be controlled not to exceed the upper limit, i.e. the power supply capacity of the battery 51, by reducing the brightness of the backlight 24 of the liquid crystal display unit 20 instead of the clock frequency of the CPU 10. In such a case, however, the brightness of the backlight 24 of the liquid crystal display unit 20 is increased and restored to the original state at the end of the spinup of the hard disk device 30, resulting in the fluctuation of the brightness of the backlight 24 of the liquid crystal display unit 20 each time the hard disk device 30 is accessed. This often makes the user uncomfortable. At the time of spinup of the hard disk device 30, therefore, the clock frequency of the CPU 10 should preferably be reduced.

The embodiments described above concern a notebook-sized personal computer used as the data processing system. Nevertheless, the data processing system is not specifically limited, but the desktop personal computer, for example, is also included in the scope of the invention.

Also, the present invention is applicable to a data processing system driven by alternating current as well as a data processing system driven by a battery.

What is claimed is:

1. A power control unit for a data processing system having the system performance thereof capable of being switched by changing the clock frequency of a processing circuit, comprising:

a clock frequency increasing/decreasing circuit increasing/decreasing the clock frequency of said processing circuit;

a brightness reducing circuit reducing the power consumption by reducing the brightness of a display unit connected to said data processing system with the increase in the clock frequency of said processing circuit; and a brightness increasing circuit increasing the power consumption by increasing the brightness of the display unit connected to said data processing system with the decrease in the clock frequency of said processing circuit.

2. A power control unit according to claim 1,
wherein a data processing system is a notebook-sized personal computer and said display unit is a liquid crystal panel.

3. A power control unit according to claim 1,
wherein a signal increasing/decreasing the clock frequency of said processing circuit is generated by a frequency changing switch included in said data processing system.

4. A power control unit according to claim 1,
wherein a signal increasing/decreasing the clock frequency of said processing circuit is generated automatically upon detection of at least one of a brightness change of said backlight by the microcontroller included in said data processing system and a change in the power consumption in said hard disk device.

5. A power control unit according to claim 1,
wherein said brightness reducing circuit detects the current consumption due to an increase of the clock frequency of said processing circuit and reduces the brightness of said display unit in the case where said current consumption reaches a value not less than the current capacity of the battery of said data processing system.

6. A power control unit according to claim 1,
wherein said clock frequency reducing circuit reduces the clock frequency from 400 MHz to 200 MHz and said clock frequency increasing circuit increases said clock frequency from 200 MHz to 400 MHz.

7. A power control unit for a data processing system having the system performance thereof capable of being switched by changing the clock frequency of a processing circuit, comprising:
a brightness increasing/decreasing circuit increasing/decreasing a brightness of a display unit connected to said data processing system;
a clock frequency reducing circuit reducing the clock frequency of said processing circuit when the brightness of the display unit connected to said data processing system is increased; and
a clock frequency increasing circuit increasing the clock frequency of said processing circuit when the brightness of the display unit connected to said data processing system is reduced.

8. A power control unit according to claim 7,
wherein said data processing system is a notebook-sized personal computer and said display unit is a liquid crystal panel.

9. A power control unit according to claim 7,
wherein a signal increasing/decreasing the brightness of said display unit is generated by a liquid crystal unit brightness controller included in said data processing system.

10. A power control unit according to claim 7,
wherein said clock frequency reducing circuit detects the current consumption with an increase in the brightness of said display unit and reduces the clock frequency of said processing circuit when said current consumption assumes a value not less than the current capacity of said battery of said data processing system.

11. A power control unit according to claim 7,
wherein a sum of the power consumption at the maximum brightness of said display unit and the power consumption at the lower clock frequency of said processing circuit is set in a manner not to exceed the maximum tolerable electric energy of said battery.

12. A power control unit according to claim 7,
wherein said clock frequency reducing circuit reduces the clock frequency from 400 MHz to 200 MHz and said clock frequency increasing circuit increases the clock frequency from 200 MHz to 400 MHz.

13. A power control unit for a data processing system having the system performance thereof capable of being switched by changing the clock frequency of a processing circuit, comprising:
a clock frequency reducing circuit reducing the clock frequency of said processing circuit at the time of spin-up of said drive motor of the disk-shaped recording medium built into said data processing system; and
a clock frequency restoration circuit restoring the clock frequency of said processing circuit to an original condition at an end of the spin-up operation of said drive motor.

14. A power control unit according to claim 13,
wherein said data processing system is a notebook-sized personal computer and said display unit is a liquid crystal panel.

15. A power control unit according to claim 13,
wherein said clock frequency reducing circuit detects the clock frequency of said processing circuit at the time of spin-up of said drive motor and reduces the clock frequency of said processing circuit only when the clock frequency is high.

16. A power control unit according to claim 13,
wherein said clock frequency reducing circuit reduces the clock frequency from 400 MHz to 200 MHz and said clock frequency increasing circuit increases the clock frequency from 200 MHz to 400 MHz.

* * * * *